Patented May 25, 1954

2,679,530

UNITED STATES PATENT OFFICE 2,679,530

PROCESS FOR THE MANUFACTURE OF α:β-UNSATURATED CARBOXYLIC ACID ESTERS FROM β-HALOGEN CARBOXYLIC ACID ESTERS

Daniel Porret, Monthey, Switzerland, assignor to Ciba Limited, Basel, Switzerland, a Swiss firm No Drawing. Application October 27, 1950, Serial No. 192,626

Claims priority, application Switzerland November 4, 1949

7 Claims. (Cl. 260—486)

It is known that α:β-unsaturated carboxylic acid esters can be made from halogen-carboxylic acid esters by splitting off hydrogen halide. However, the splitting off of hydrogen halide, which can be carried out by known methods, for example, by treating the halogen-carboxylic acid ester with an acid agent capable of splitting off hydrogen halide, such as concentrated sulfuric acid, phosphoric acid or zinc chloride, leads in most cases to unsatisfactory yields owing to the occurrence of side reactions. Furthermore, the use of inorganic bases such, for example, as sodium carbonate, potassium hydroxide or alcoholic solutions of alkali hydroxides, is attended by various disadvantages, especially in view of the fact that it is almost impossible to avoid partial hydrolysis of both the halogen-carboxylic acid ester used as starting material and the α:β-unsaturated carboxylic acid ester produced. For this reason it has been proposed to use aromatic tertiary amines such as dimethylaniline or diethylaniline. However, the splitting off of hydrogen halide from halogen-carboxylic acid esters by means of these amines takes place with sufficient speed only at relatively high temperatures; and side reactions cannot be avoided, since, for example, the amines used are partially decomposed by the hydrogen halide formed, so that in addition to a reduced yield of the α:β-unsaturated carboxylic acid esters there is also a loss of aromatic amine.

The present invention is based on the unexpected observation that α:β-unsaturated carboxylic acid esters such as acrylic acid esters, crotonic acid esters, β-furyl-acrylic acid esters, cinnamic acid esters, methacrylic acid esters and the like, can be obtained in very good yield from the corresponding β-halogen carboxylic acid esters by treating the halogen-carboxylic acid esters with tertiary aliphatic amines. The splitting off of hydrogen halide by means of these amines takes place unexpectedly almost quantitatively even at temperatures sufficiently low to enable side reactions to be avoided. In this way it is possible, not only to obtain very high yields of α:β-unsaturated carboxylic acid esters, but also to regenerate with very small loss the aliphatic tertiary amine used for the splitting off of hydrogen halide. It has also been observed that, instead of using the aliphatic tertiary amines alone, mixtures of such amines with inorganic bases such, for example, as ammonium hydroxide and especially alkali hydroxides, alkaline earth metal hydroxides or alkali carbonates, for example, sodium hydroxide, potassium hydroxide, sodium carbonate, potassium carbonate and the like, can be used, and that the use of such mixtures enables the amount of aliphatic tertiary amine to be reduced to about 20 per cent.

As starting materials for use in the present process there may be mentioned, for example, β-chloro-propionic acid esters such as the ethyl, isopropyl or butyl ester, and also β-phenyl-β-chloro-propionic acid esters, β-furyl-β-chloro-propionic acid esters, β-chloro-butyric acid esters and β-chloro-isobutyric acid esters. The corresponding bromine compounds may, of course, also be used, whereas the iodine compounds appear to be practically unsuitable.

As aliphatic tertiary amines there may be used in the present process those containing, for example, 3–30 carbon atoms, for example, trimethylamine, triethylamine, tripropylamine, tributylamine or trioctylamine. Especially suitable, however, are the lower tertiary amines containing 3–9 carbon atoms such as trimethylamine, triethylamine or tripropylamine.

The production of α:β-unsaturated carboxylic acid esters in accordance with the present invention may be conducted in the presence or absence of water or an organic solvent. The reaction temperature may vary within fairly wide limits depending on the starting materials used and on the reactivity of the tertiary aliphatic amine. Preferably, however, the temperature should neither substantially exceed 100° C. nor substantially fall below 70° C.; it is of advantage to work at 80–90° C.

In the case of α:β-unsaturated reaction products which polymerize easily it is of advantage to add to the reaction mixture a small proportion of a polymerization inhibitor such, for example, as hydroquinone.

The following examples illustrate the invention, the parts being by weight unless otherwise stated and the relationship of parts by weight to parts by volume being the same as that of the kilogram to the liter:

Example 1

A mixture of 136.5 parts of β-chloropropionic acid ethyl ester, 105 parts of triethylamine, 20 parts by volume of water and 0.2 part of hydroquinone are heated for 1½ hours in a reflux apparatus at about 80° C., while stirring. A precipitate of triethylamine hydrochloride separates out. The whole is cooled, and 150 parts by volume of water are added in order to dissolve the hydrochloride. The excess of amine is then neutralized by the addition of hydrochloric acid, and then the acrylic acid ester formed is distilled in the form of an azeotropic mixture with water at 40° C. and under a pressure of about 80 mm. The aqueous layer is separated, and 102 parts of acrylic acid ethyl ester containing 2-3 parts of water are obtained. The yield is almost quantitative. By adding caustic soda solution to the distillation residue 112 parts of triethylamine having a purity of 85 per cent are obtained, which may be used directly for a subsequent reaction. The remainder of the triethylamine (7 parts) can be recovered by distillation.

Instead of triethylamine a corresponding quantity of tripropylamine may be used.

Example 2

A mixture of 150.5 parts of β-chloro-propionic acid iso-propyl ester, 105 parts of triethylamine, 20 parts by volume of water and 0.2 part of hydroquinone is heated for 1½ hours in a reflux apparatus at about 80° C. 150 parts by volume of water are added to the reaction mixture and the excess of amine is neutralized. The acrylic acid ester formed is then distilled with steam under a pressure of about 80 mm. After separating the aqueous layer, there are obtained 109 parts of acrylic acid isopropyl ester containing traces of water. The yield amounts to 95 per cent of the theoretical yield.

Instead of triethylamine there may be used a corresponding quantity of tributylamine.

Example 3

A mixture consisting of 164.5 parts of β-chloropropionic acid butyl ester, 105 parts of triethylamine, 30 parts by volume of water and 0.2 part of hydroquinone are heated for 1½ hours in a reflux apparatus at about 90° C. When the reaction has finished 150 parts by volume of water are added, and then the mixture is acidified. By distilling at 40° C. under 70 mm. pressure, there is obtained a mixture of acrylic acid butyl ester and water. After separating the water, 125 parts of acrylic acid butyl ester are obtained. The yield amounts to 98 per cent of the theoretical yield.

Example 4

A mixture of 276.5 parts of the ester of β-chloropropionic acid with 2:6:8-trimethyl-nonyl-4-ol, 105 parts of triethylamine, 20 parts by volume of water and 0.2 part of hydroquinone is heated for 1½ hours in a reflux apparatus at about 90° C. When the reaction has finished, 200 parts by volume of water are added to the mixture and the whole is then acidified. The acrylic acid ester so obtained is separated from the aqueous layer and purified by distillation at 80° C. under a pressure of 0.3 mm. A good yield of the purified acrylic acid ester is obtained.

Example 5

A mixture of 190.5 parts of β-chloropropionic acid cyclohexyl ester, 105 parts of triethylamine, 20 parts by volume of water and 0.2 part of hydroquinone is heated for 1½ hours in a reflux apparatus at about 90° C. The mixture is then cooled and mixed with 200 parts by volume of water. The resulting acrylic acid ester is isolated and purified by distillation at 60° C. under 0.3 mm. pressure. In this manner the pure acrylic acid cyclohexyl ester is obtained in good yield.

Example 6

A mixture of 136.5 parts of β-chloropropionic acid ethyl ester, 25 parts of triethylamine, 110 parts of sodium hydroxide solution of 30 per cent strength and 0.2 part of hydroquinone is heated for 1½ hours in a reflux apparatus at about 80° C. 150 parts by volume of water are added to the reaction mixture and the excess of amine is neutralized. The acrylic acid ester so obtained is then distilled with steam under a pressure of about 80 mm. After separating the aqueous layer there are obtained 102–103 parts of acrylic acid ethyl ester containing 2–3 parts of water. The yield is approximately quantitative. By rendering the residue alkaline and distilling with steam, the amine is recovered almost quantitatively in the form of a solution of about 80 per cent strength.

Example 7

A mixture of 178.5 parts of β-chloro-α-methyl-propionic acid butyl ester, 105 parts of triethylamine, 25 parts by volume of water and 0.2 part of hydroquinone are heated for one hour in a reflux apparatus at 80–90° C., while stirring. Upon cooling, a precipitate of triethylamine hydrochloride separates out. 200 parts by volume of water are added in order to dissolve the hydrochloride, the excess of amine is neutralized by the addition of dilute sulfuric acid and then the resultant methacrylic acid butyl ester is distilled off in good yield in the form of an azeotropic mixture with water. After separating the aqueous layer, the methacrylic acid butyl ester formed is isolated. In order to prevent any polymerization, the distillation is advantageously carried out in the presence of metallic copper.

What I claim is:

1. A process for the manufacture of an α,β-unsaturated carboxylic acid ester from the corresponding saturated β-halogen carboxylic acid ester, the halogen atom of which is a member selected from the group consisting of chlorine and bromine, and the α-carbon atom of which is free from any halogen atom, comprising splitting off hydrogen halide by treating the β-halogen carboxylic acid ester with an aliphatic tertiary amine and an inorganic base.

2. A process for the manufacture of an α,β-unsaturated carboxylic acid ester from the corresponding saturated β-halogen carboxylic acid ester, the halogen atom of which is a member selected from the group consisting of chlorine and bromine, and the α-carbon atom of which is free from any halogen atom, comprising splitting off hydrogen halide by treating the β-halogen carboxylic acid ester with an aliphatic tertiary amine containing 3–9 carbon atoms and an inorganic base.

3. A process for the manufacture of an α,β-unsaturated carboxylic acid ester from the corresponding saturated β-halogen carboxylic acid ester, the halogen atom of which is a member selected from the group consisting of chlorine and bromine, and the α-carbon atom of which is free from any halogen atom, comprising splitting off hydrogen halide by treating the β-halogen carboxylic acid ester with an aliphatic tertiary amine containing 3–9 carbon atoms and an inorganic base selected from the group consisting of an alkali metal hydroxide and of an alkaline earth metal hydroxide at 70–100° C.

4. A process for the manufacture of an α,β-unsaturated carboxylic acid ester from the corresponding saturated β-halogen carboxylic acid ester, the halogen atom of which is a member selected from the group consisting of chlorine and bromine, and the α-carbon atom of which is free from any halogen atom, comprising splitting off hydrogen halide by treating the β-halogen carboxylic acid ester with triethyl amine and sodium hydroxide at 70–100° C., the triethyl amine constituting at least 20 per cent. of the total weight of the triethyl amine and the sodium hydroxide.

5. A process for the manufacture of an α,β-unsaturated carboxylic acid ester from the corresponding saturated β-chloro-carboxylic acid ester, the α-carbon atom of which is free from any halogen atom, comprising splitting off hydrogen chloride by treating a β-chloro-carboxylic acid ester with an aliphatic tertiary amine containing 3–9 carbon atoms and an inorganic base of the group consisting of an alkali hydroxide and an alkaline earth metal hydroxide at 70–100° C.

6. A process for the manufacture of an α,β-unsaturated carboxylic acid ester from the corresponding saturated β-chloro-carboxylic acid ester, the α-carbon atom of which is free from any halogen atom, comprising splitting off hydrogen chloride by treating a β-chloro-carboxylic acid ester with triethyl amine and sodium hydroxide at 70–100° C.

7. A process for the manufacture of an acrylic acid ester from the corresponding saturated β-chloro-propionic acid ester comprising splitting off hydrogen chloride by treating the β-chloro-propionic acid ester with triethyl amine and sodium hydroxide at 70–100° C., the triethyl amine constituting at least 20 per cent. of the total weight of the triethyl amine and the sodium hydroxide.

References Cited in the file of this patent
UNITED STATES PATENTS

| Number | Name | Date |
|---|---|---|
| 1,864,884 | Bauer | June 28, 1932 |
| 2,298,739 | Lichty | Oct. 13, 1942 |
| 2,326,095 | D'Ianni | Aug. 3, 1943 |
| 2,376,067 | Long | May 15, 1945 |
| 2,386,694 | Lichty | Oct. 9, 1945 |